(No Model.)

L. GATHMANN.
MILL DISK DRESS.

No. 274,116.  Patented Mar. 20, 1883.

WITNESSES
F. U. Adams
C. Clarence Poole

INVENTOR
Louis Gathmann,
per M. E. Dayton,
Attorney.

UNITED STATES PATENT OFFICE.

LOUIS GATHMANN, OF CHICAGO, ILLINOIS.

MILL-DISK DRESS.

SPECIFICATION forming part of Letters Patent No. 274,116, dated March 20, 1883.

Application filed August 11, 1882. (No model.)

*To all whom it may concern:*

Be it known that I, LOUIS GATHMANN, of Chicago, in the county of Cook and State of Illinois, have invented certain new and useful Improvements in Mill-Disk Dress; and I do hereby declare that the following is a full, clear, and exact description thereof, reference beinghad to the accompanying drawings, and to the letters of reference marked thereon, which form a part of this specification.

This invention relates to features of construction in the dress of mill-disks of the general character shown in Letters Patent granted to me March 14, 1882, and numbered 254,814, the distinctive characteristic of which is, that the grain can escape from between the disks only by passing over a "land," and having passed a land is at once discharged.

The improvement herein described has reference more particularly to the form of the furrows and recesses in one of the disk-faces. In the present instance these depressions in the disk-face are of pointed or triangular shape and arranged alternately in opposite directions, whereby intervening lands of substantially uniform width are left between them. With a furrowed and recessed disk of this description an opposing disk is combined having a substantially plain surface, by which is meant one which, if roughened or provided with a dress, has only such shallow depressions in its working-face as will not allow grain-kernels to escape over the lands of the opposing disk in any relative position of the two disks.

Figure 1:
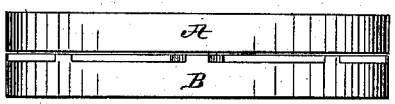
Figure 2:
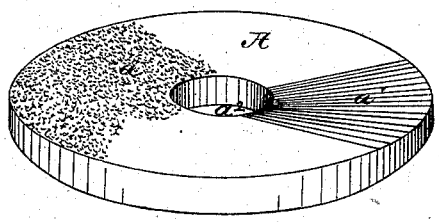
Figure 3:
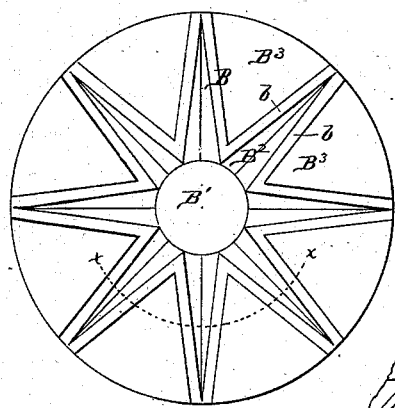
Figure 4:
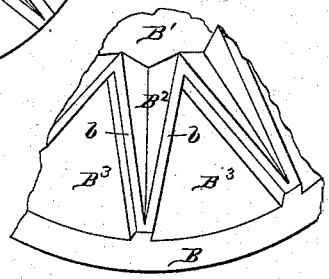
Figure 5:
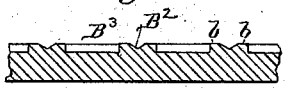

In the drawings, Figure 1 is a side elevation of two mill-disks embracing my improvements, which said disks may be supposed to be mounted in the usual manner in a grinding-mill, preferably with a vertical axis. Fig. 2 is a perspective view of one of the disks having a substantially plain face. Fig. 3 is a plan view of the working-face of the furrowed and recessed disk. Fig. 4 is a fragmentary perspective view of the recessed and furrowed disk. Fig. 5 is a vertical section of the recessed and furrowed disk, taken through the curved line $xx$ of Fig. 3, supposed to be straightened in said Fig. 5.

A is a plain, or substantially plain, surfaced mill-disk, which, in a mill having a vertical axis, is preferably and usually stationary and uppermost.

B is the disk opposed to the disk A, and is usually and preferably arranged as an under runner on a vertical axis, as shown in Fig. 1. The disk B is provided with a central depressed bosom, B', from which pointed furrows $B^2$, having both lateral walls inclined, are directed either radially or on a draft to, or nearly to, the margin of the disk. Between these outwardly-projecting depressions or furrows are segmental depressions or recesses $B^3$, open at the margin of the disk, and having their lateral and inwardly-converging walls vertical or at least abrupt. Said recesses have their converging walls so directed as to leave lands $b\ b$ of substantially uniform width between the furrows and recesses. The inclined surfaces $b'$ of the furrows $B^2$ are preferably equally inclined planes, which meet midway between the lands, and therefore give to said furrows a gradual and uniform increase in depth from their points to the bosom. The depth of the furrows is such as to allow grain-kernels or fragments to pass outward nearly to their extremities when the disk is set in opposition to and at a proper distance from the plane-faced disk A. The recesses $B^3$ are of such depth as to insure the escape of material therefrom at their open ends at the margin of the disk.

The disk A may be roughened on its working-face, as shown at $a$, or provided with a fine linear or other shallow dress, as suggested at $a'$. The dress of said disk is preferably uniform, and the grooves or depressions therein are necessarily of such small dimensions that in all relative positions of the two disks grain can escape from a furrow, $B^2$, to an adjacent recess, $B^3$, of the disk B only by being ground between the intervening land $b$ and the face of the disk A.

The operation of the disk B, when used in opposition to the disk A, is in all essential respects like that of the furrowed and recessed disk described in the before-mentioned Letters Patent No. 254,814. The grain to be ground is fed through the eye $a^2$ of the stationary disk A. It passes outward from the bosom B' of the disk B into the furrows $B^2$, rises on the rearward inclined faces $b'$ of said furrows, passes over the adjacent lands $b$, in which passage it is ground or broken between said land and the opposing disk A, falls into the contiguous recesses $B^3$, and thence escapes at the margin of the disk. By reason of the abruptness of the walls of the recesses $B^3$, the grain having passed one land, $b$, cannot rise to another, but is thereupon discharged. The objects of securing this operation in a grinding-mill are fully set forth in said former patent, and need not be here repeated.

The objects of the formal features of construction in the disk B here shown are, first, to facilitate the construction of the disk, and, second, to provide for the alternate use of its different land-surfaces.

The disk B will usually be of cast-iron, with chilled face, or of steel. In size it will be about sixteen inches in diameter, and, say, two inches thick. The furrows $B^2$ will have their faces $b'$ smoothed out ordinarily by means of an emery-wheel. In the form of said furrows here shown it is more readily practicable to give said furrow-faces the necessary smoothness with the aid of available forms of machinery.

By inclining the faces of the furrows $B^2$ equally from a central line and finishing both said faces, the disk B may be run alternately in both directions, and thus when one set of lands $b$ become worn the remaining set may be brought into use Generally the lands $b$ will be plain-surfaced or smooth; but they may, if desired, be roughened or provided with any desirable form of dress, as already explained in my before-mentioned Letters Patent.

I claim as my invention—

In a grinding-mill, the combination, with an opposing disk, A, having a practically plane surface, of a disk, B, provided with pointed furrows $B^2$, alternating segmental recesses $B^3$, and intervening lands $b$, said furrows $B^2$ having their bottom faces, $b'$, inclined in opposite directions from a median line to the surface of the adjacent lands, and said lands being of substantially uniform width, substantially as described, and for the purposes set forth.

In testimony that I claim the foregoing as my invention I affix my signature in presence of two witnesses.

LOUIS GATHMANN.

Witnesses:
M. E. DAYTON,
JESSE COX, Jr.